United States Patent
Jeon et al.

(10) Patent No.: US 7,635,242 B2
(45) Date of Patent: Dec. 22, 2009

(54) CHAMFERING TOOL EASILY ADJUSTING THE DEPTH OF CUT

(75) Inventors: Byeong-Woo Jeon, Daejeon (KR); Byeong-Gwon Jeon, Daejeon (KR)

(73) Assignee: Dae Sung Golden Technology, Daejeon (KR)

( * ) Notice: Subject to any disclaimer, the term of this patent is extended or adjusted under 35 U.S.C. 154(b) by 0 days.

(21) Appl. No.: 12/223,576

(22) PCT Filed: Feb. 13, 2007

(86) PCT No.: PCT/KR2007/000765

§ 371 (c)(1),
(2), (4) Date: Nov. 17, 2008

(87) PCT Pub. No.: WO2007/094602

PCT Pub. Date: Aug. 23, 2007

(65) Prior Publication Data

US 2009/0145279 A1 Jun. 11, 2009

(30) Foreign Application Priority Data

Feb. 14, 2006 (KR) ..................... 10-2006-0014224

(51) Int. Cl.
*B23C 1/20* (2006.01)
(52) U.S. Cl. ..................... 409/138; 409/180; 409/210; 409/218; 408/241 S
(58) Field of Classification Search ................ 409/138, 409/139, 140, 180, 182, 184, 210, 214, 218, 409/181; 408/241 S, 202, 110; 144/136.95, 144/154.5
See application file for complete search history.

(56) References Cited

U.S. PATENT DOCUMENTS

| 4,279,554 | A | * | 7/1981 | Seidenfaden | ................ 409/180 |
| 4,784,540 | A | * | 11/1988 | Underhaug | ................ 409/140 |
| 4,946,323 | A | * | 8/1990 | Kazama et al. | ............ 409/178 |
| 4,964,765 | A | * | 10/1990 | Kishi | ......................... 409/181 |
| 5,018,914 | A | * | 5/1991 | Kishi | ......................... 409/178 |
| 6,050,759 | A | * | 4/2000 | Bone | ......................... 409/182 |
| 6,733,216 | B2 | * | 5/2004 | Bohringer | ................... 409/138 |

FOREIGN PATENT DOCUMENTS

| JP | 01-271110 A | * | 10/1989 |
| JP | 10-086011 A | * | 4/1998 |

OTHER PUBLICATIONS

Machine Translation of JP-10-086011-A (wherein JP-10-089011 was published in Apr. 1998).*

* cited by examiner

*Primary Examiner*—Erica E Cadugan
(74) *Attorney, Agent, or Firm*—Jenkins, Wilson, Taylor & Hunt, P.A.

(57) ABSTRACT

The present invention relates to a beveling machine which makes a slanting surface on the edge of a member to be processed, and more particularly, to a beveling machine which is capable of easily controlling the extent of bevel, by minutely controlling the extent of bevel by a simple method of using a bevel-extent controlling unit which is one-touch operated, accurately maintaining the extent of bevel which is automatically controlled at the moment of unloosing the bevel-extent controlling unit which is held, and quickly and easily resetting a reference point of the extent of bevel which is changed after replacing a cutting tip.

7 Claims, 5 Drawing Sheets

[Fig. 1]
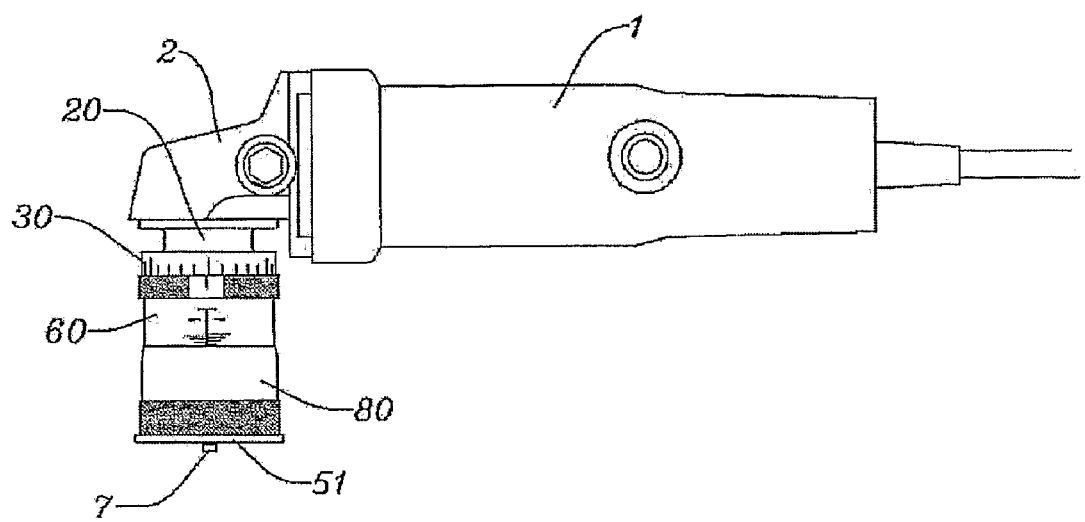
[Fig. 2]
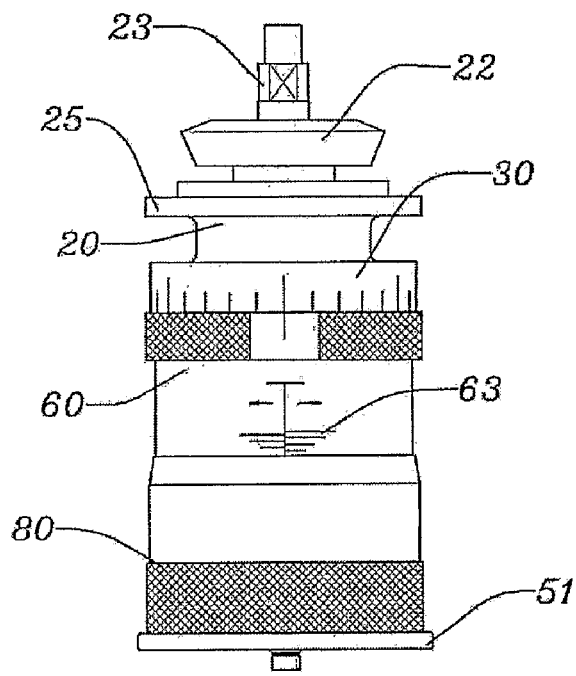

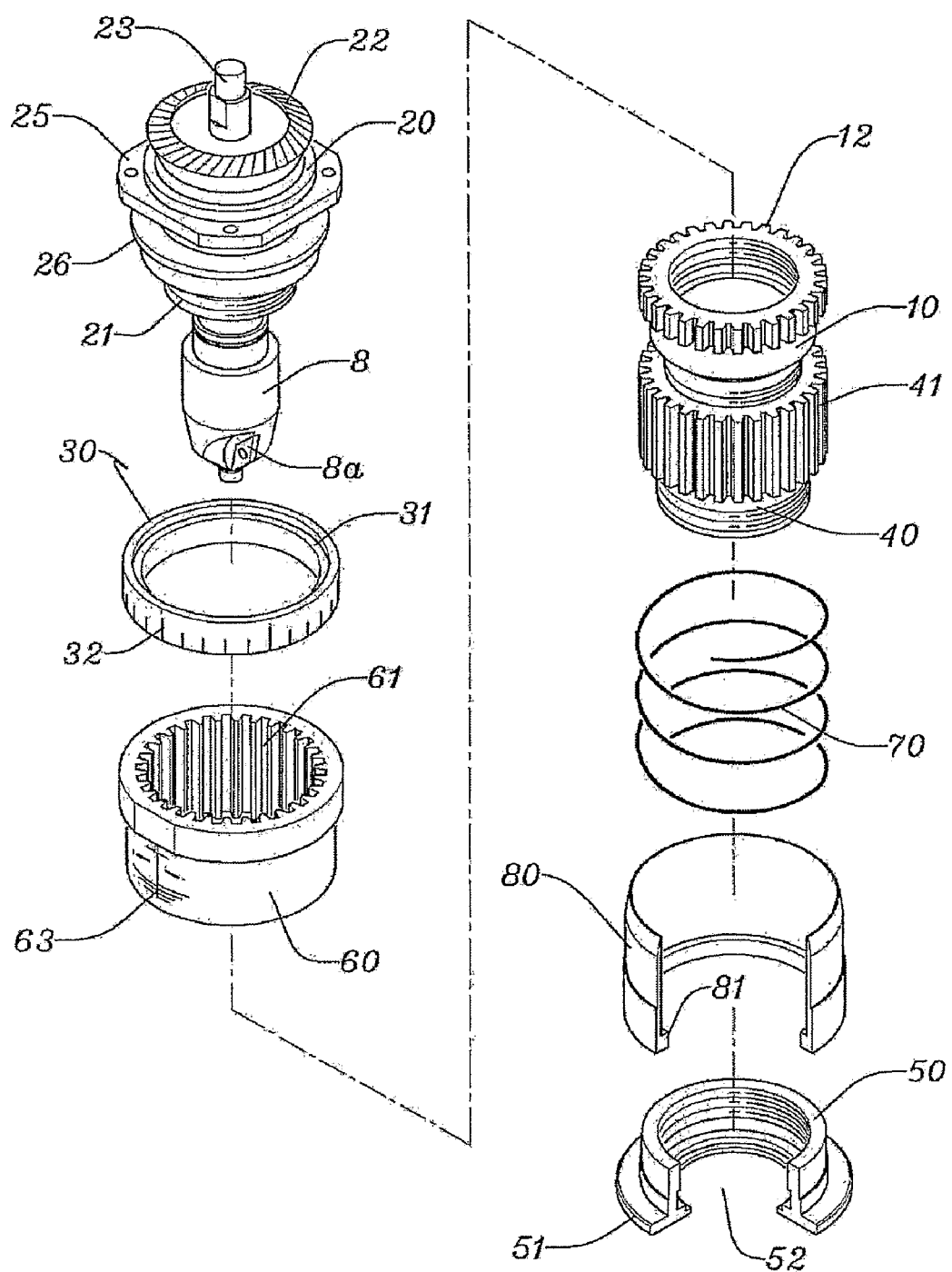
[Fig. 3]

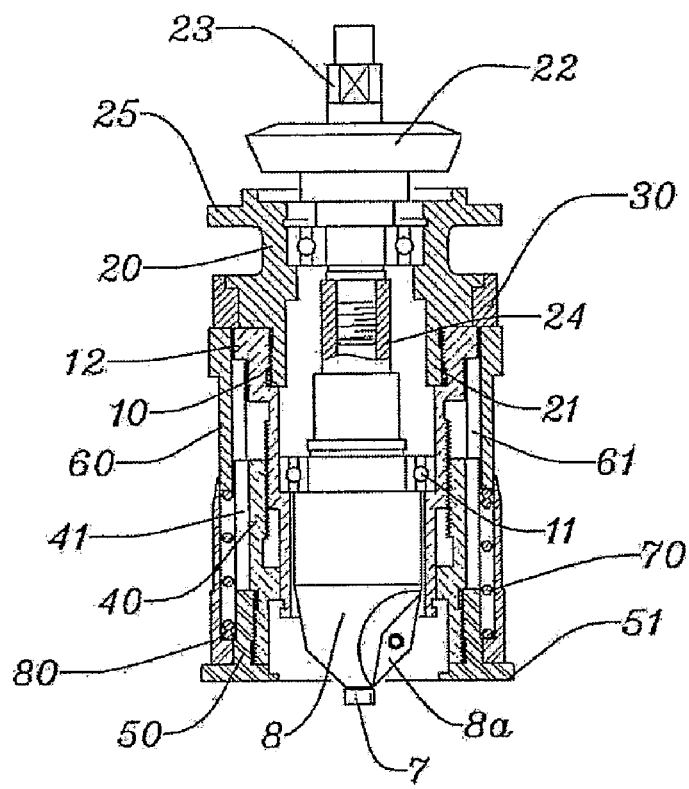
[Fig. 4]
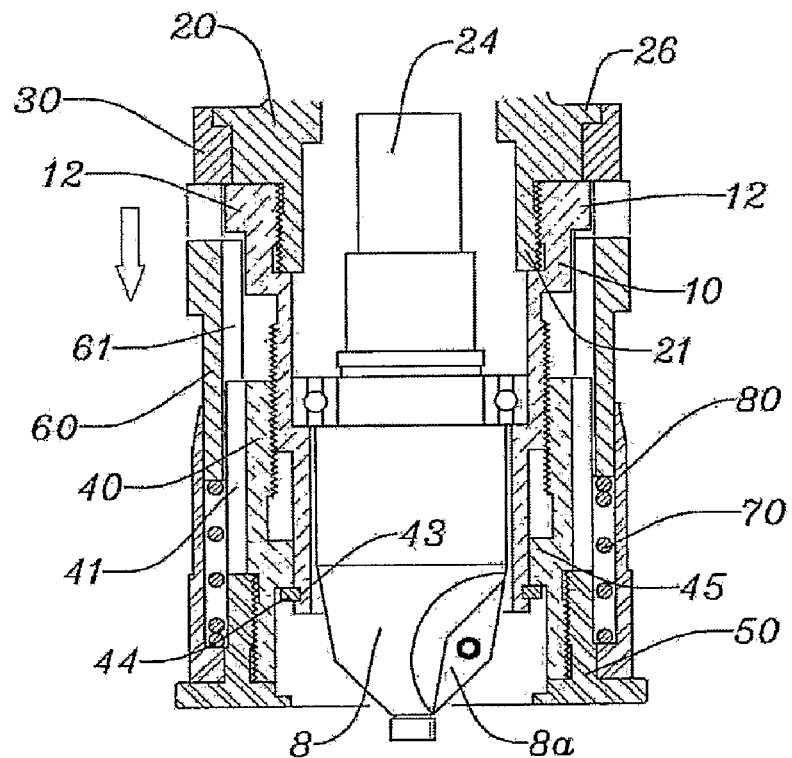
[Fig. 5]

[Fig. 6]
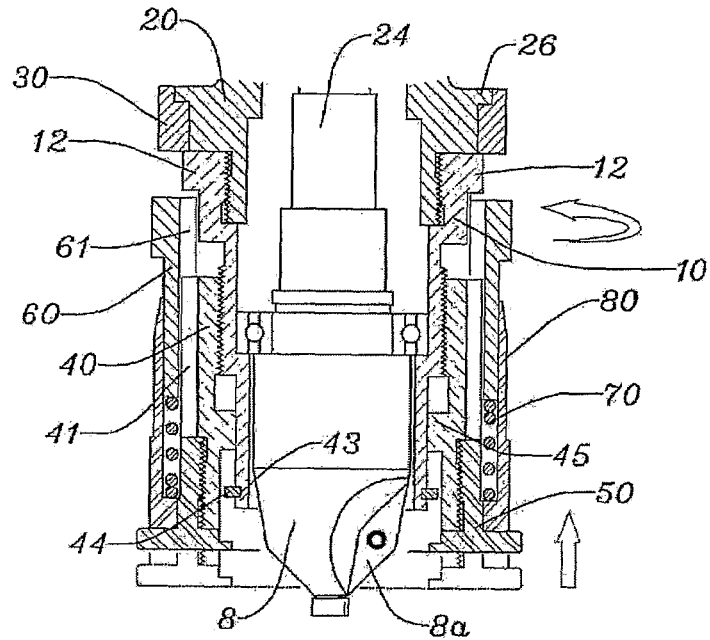
[Fig. 7]
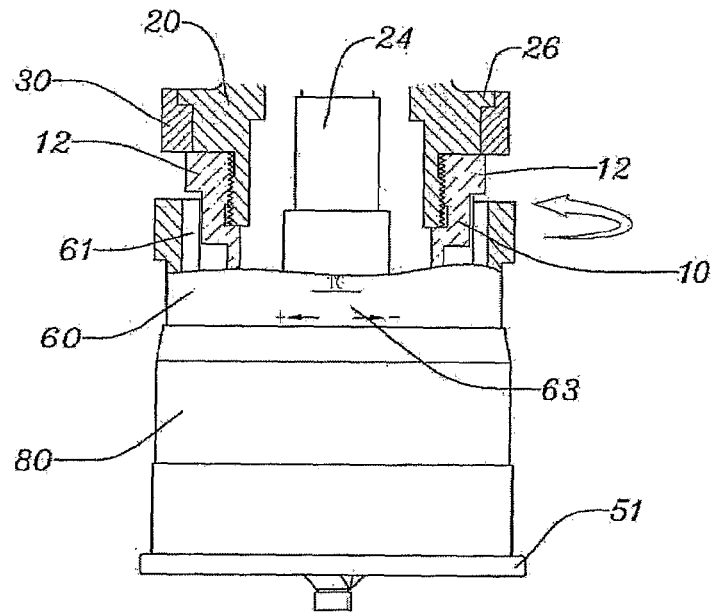
[Fig. 8]
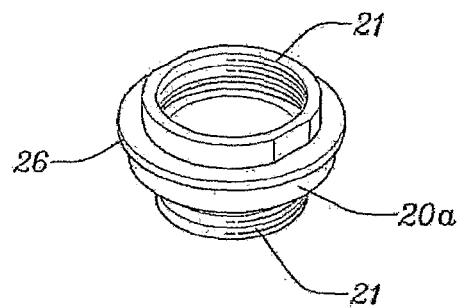

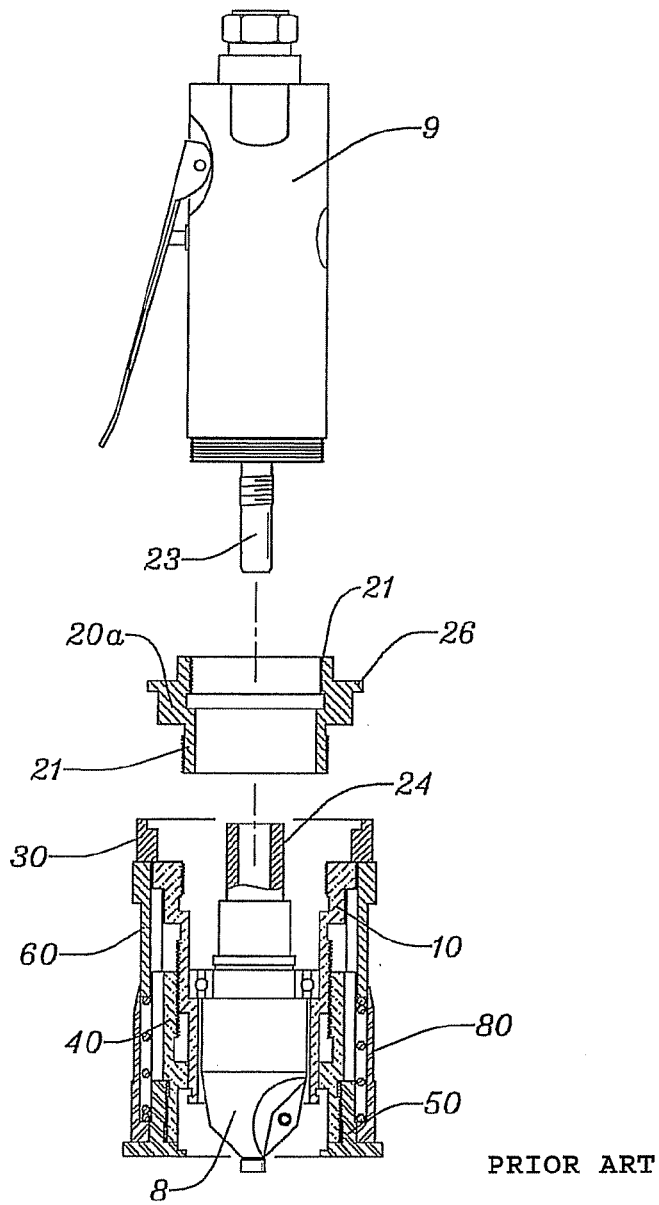
[Fig. 9]
PRIOR ART
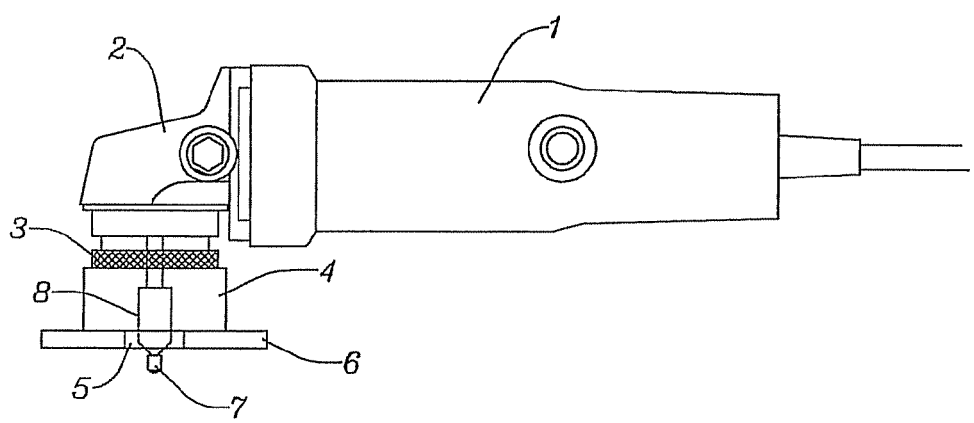
[Fig. 10]

CHAMFERING TOOL EASILY ADJUSTING THE DEPTH OF CUT

TECHNICAL FIELD

The present invention relates to a beveling machine which makes a slanting surface on the edge of a member to be processed, and more particularly, to a beveling machine which is capable of easily controlling the extent of bevel, by minutely controlling the extent of bevel by a simple method of using a bevel-extent controlling unit which is one-touch operated, accurately maintaining the extent of bevel which is automatically controlled at the moment of unloosing the bevel-extent controlling unit which is held, and quickly and easily resetting a reference point of the extent of bevel which is changed after replacing a cutting tip.

BACKGROUND ART

Generally, a beveling process is to chamfer a sharp edge portion of steel, nonferrous or resin materials. The beveling process is typically performed at a last processing process. Since the quality of a product depends on the quality of a beveled edge, special attention needs to be paid to the beveling process for obtaining the slanting surface which is clear and neat like a mirror by maximally improving the level of surface.

For the beveling process, when a motor is driven by an electric power and a cutting tip is rotated by a driving force of the motor, a beveling machine processes the edge of a member to be processed.

An example of a conventional bevel is illustrated in FIG. 10. The conventional bevel includes: a beveling body 1 in which a driving device such as a motor is positioned; a supporting holder 4 which is connected, by a screw, to a lower part of a direction changing unit 2, connected to one side of the beveling body 1, so as to be transferred up or down and is fixed by a fixing unit 3; a guide plate 6 which is positioned below the supporting holder 4 and guides a position to be beveled on a member to be processed, the guide plate 6 including a cutter exposing opening 5 formed in the middle part thereof; and a rotary cutting unit 8 which is mounted onto a rotation shaft driven by the motor, allows a guide roller 7 to be exposed through the cutter exposing opening 5 and includes a cutting tip on a slope being in a cone shape.

When the beveling machine is operated while the guide plate 6 is secured against a horizontal surface of the member to be processed and simultaneously the guide roller 7 is secured against an adjacent vertical surface of the member, the rotary cutting unit 8 rotates to shape a slanting surface.

The extent of bevel by the beveling machine is determined according to the extent of exposure of the rotary cutting unit 8 to the outside through the cutter exposing opening 5 on the guide plate 6. The more the rotary cutting unit 8 is exposed to the outside, the larger the slanting surface is processed.

DISCLOSURE OF INVENTION

Technical Problem

However, to control the extent of bevel in the conventional beveling machine, the extent of exposure of the rotary cutting unit needs to be controlled by releasing the fixing state by the fixing unit and then rotating the supporting holder 4 being connected by the screw by eye measure. Thus, it is very difficult to control the extent of bevel and it takes a long time to perform a beveling process due to the control of the extent of bevel, thereby lowering the work efficiency. Moreover, when the extent of bevel according to kinds of members to be processed needs to be controlled every work, the extent of bevel is not uniform and the members are not precisely processed, thereby considerably deteriorating the quality of work.

Moreover, the extent of bevel cannot be minutely controlled as a predetermined unit, and as the supporting holder is little by little loosened during the process, the preset extent of bevel cannot be accurately maintained.

Moreover, after replacing the cutting tip by separating the supporting holder and when reassembling the supporting holder, it is very difficult to set an original reference point of the extent of bevel.

Technical Solution

Accordingly, it is an object of the present invention to solve the aforementioned problems caused by a conventional bevel and to provide a beveling machine in which the extent of bevel is minutely and accurately controlled by rotating a bevel-extent controlling unit by beveling graduations being divided into equal parts when the bevel-extent controlling unit is slidingly transferred and a rotation locking state is temporarily released, and in which the controlled extent of bevel is accurately maintained when the bevel-extent controlling unit is unloosed and a locking state is automatically set, thereby improving the quality of work.

It is another object of the present invention to provide a beveling machine which is used by selectively connecting to a conventional bevel basic frame or an air tool according to the kind of an adapter connected to an upper part of a cutting unit housing, thereby improving a wide use.

Advantageous Effects

A beveling machine according to the present invention has the effects of minutely and accurately controlling the extent of bevel as desired, by a simple method of transferring a bevel-extent controlling unit by sliding, temporarily releasing a locking state, and rotating the bevel-extent controlling unit to be set to a divided beveling graduation; and therefore, improving the quality of work and expanding the range of work by significantly shortening a time for controlling the extent of bevel and processing a member to be processed in more various sizes.

Furthermore, since the bevel-extent controlling unit continuously maintains the locking state unless it is artificially operated, the extent of bevel being preset is accurately maintained, thereby consistently providing the quality of work with uniformity.

Furthermore, the beveling machine is used by being selectively connected to a conventional beveling body or an air tool, according to the kind of an adapter connected to an upper end of the bevel-extent controlling unit, thereby improving the wide use thereof.

Since a reference setting graduation is indicated in the bevel-extent controlling unit, an original reference point of the extent of bevel is accurately reset after replacing a cutting tip, thereby additionally providing the convenience in the use thereof.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1 is an exemplary view illustrating a beveling machine according to the present invention being attached to a beveling body;

FIG. 2 is a front view illustrating the beveling machine according to the present invention;

FIG. 3 is a dissembled perspective view illustrating an inner structure of the beveling machine according to the present invention being partially cut;

FIG. 4 is a vertical sectional view illustrating the inner structure of the beveling machine according to the present invention being connected;

FIG. 5 is a vertical sectional view illustrating a bevel-extent controlling unit according to the present invention being transferred by downward sliding;

FIG. 6 is a vertical sectional view illustrating a state of controlling the extent of bevel by a rotation operation of the bevel-extent controlling unit according to the present invention;

FIG. 7 is a view illustrating a state of setting a reference point of the extent of bevel, using a reference setting graduation according to the present invention;

FIG. 8 is a perspective view illustrating an adapter for an air tool, according to the present invention;

FIG. 9 is a vertical view illustrating a state of connecting the beveling machine according to the present invention to the air tool; and FIG. 10 is an exemplary view illustrating a conventional beveling machine.

EXPLANATION ON ESSENTIAL ELEMENTS OF DRAWINGS

1: beveling body 4, 50: supporting holder
9: air tool 10: cutting unit housing
12: fixed spline 20, 20a: adapter
23: power shaft 26: outward flange
30: ruler 40: transfer guiding holder
41, 61: rotary spline 44: snap ring
60: bevel-extent controlling unit
63: reference setting graduation
70: elastic member 80: spring cover

BEST MODE FOR CARRYING OUT THE INVENTION

To effectively achieve the aforementioned objects of the present invention, a beveling machine easily controlling the extent of bevel will be described with reference to a preferred embodiment of the present invention.

The core technical constitution of the present invention is formed by interconnecting the constituents illustrated in FIGS. 3 and 4. A beveling machine according to the present invention comprises: a cutting unit housing 10 including a fixed spline 12 formed on the upper outer surface thereof; an adapter 20 or 20a which is connected to the cutting unit housing 10 and selectively connected to a tool of supplying rotation power to a rotary cutting unit 8; a ruler 30 with graduations which is fitted between the adapter 20 or 20a and the cutting unit housing 10; a transfer guiding holder 40 which is connected to the cutting unit housing 10, transfers up or down, and includes a rotary spline 41 formed on the outer surface thereof; a supporting holder 50 which is connected to a lower part of the transfer guiding holder 40 by a screw; a bevel-extent controlling unit 60 which includes a rotary spline 61 formed on the inner surface thereof and controls and maintains the extent of bevel while being selectively transferred up or down, wherein the rotary spline 61 is connected to the rotary spline 41 of the transfer guiding holder 40 and the fixed spline 12 of the cutting device housing 10; and an elastic member 70 which provides the bevel-extent controlling unit 60 with elasticity.

Mode for the Invention

The present invention will now be described more fully hereinafter with reference to the accompanying drawings, in which preferred embodiments of the invention are shown.

The cutting device housing 10 is formed in a multistage shape and has the diameter which becomes smaller progressively towards a lower part thereof. The rotary cutting unit 8 is rotatively positioned at a protruding part formed inside the cutting device housing 10 by a rotation supporting unit 11. The fixed spline 12 is positioned at the upper outer surface of the cutting device housing 10, to continuously and accurately maintain the preset extent of bevel and minutely and uniformly control the extent of bevel.

The adapter 20 or 20a being connected to an upper part of the cutting unit housing 10 by a screw functions as an agent for the integration connection with each tool, such as a beveling body 1 or an air tool 9. That is, the adapter 20 or 20a transfers the rotation power generated in the beveling body 1 or the air tool 9 to the rotary cutting unit 8.

To this end, when the adapter 20 is connected to the beveling body 1, a connection part 21 positioned at a lower part of the adapter 20 is connected to the upper part of the cutting unit housing 10 by a screw, and a power shaft 23 with a spiral bevel gear 22 is rotatively positioned in the inner middle part of the adapter 20. A lower end of the power shaft 23 is connected to a rotation shaft 24, using a screw. The rotation shaft 24 is connected to the rotary cutting unit 8.

Accordingly, as illustrated in FIG. 1, when a mounting plate 25 positioned on the adapter 20 is connected to a direction changing unit 2 of the beveling body 1, the spiral bevel gear 22 is engaged with another spiral bevel gear positioned on the motor shaft of the beveling body 1, the rotary cutting unit 8 is operated, using the rotation power of the beveling machine.

Further, the use of the beveling machine according to the present invention is not limited to the conventional beveling body 1. The beveling machine is usable in connection to the air tool 9 being operated by high pressure air. As illustrated in FIGS. 8 and 9, a connection part 21 positioned at a lower part of the adapter 20a is connected to the upper part of the cutting unit housing 10 by a screw, and a power shaft 23 of the air tool 9 penetrates the connection part 21 and is connected by a screw. The power shaft 23 of the air tool 9 is connected to the rotation shaft 24, which is connected to the rotary cutting unit 8, by a screw, so that the rotary cutting unit 8 is operated, using the rotation power of the air tool 9.

The ruler 30 with graduations is fitted between an outward flange 26 which is formed on the outer side of the adapter 20 or 20a and an upper end of the cutting unit housing 10. The outward flange 26 is connectedly held in an inserted part 31 formed on an inner circumference of the ruler 30 with graduations.

The transfer guiding holder 40, which is connected to the outside of the cutting unit surface 10 and transfers selectively up or down, includes the rotary spline 41 formed on the outside of the transfer guiding holder 40. When the bevel-extent controlling unit 60 is rotated, the rotary splint 41 transfers the rotation force to the transfer guiding holder 40 and simultaneously guides the smooth upward or downward sliding transfer of the bevel-extent controlling unit 60.

The supporting holder 50 is connected to the lower outside of the transfer guiding holder 40 by a screw. A guide plate 51 is formed in a single body under the supporting holder 50. The guide plate 51 is held on the upper surface of the member to be processed and guides the position to be beveled upon work. An exposure groove 52 is formed in the middle of the guide plate 51 and allows the rotary cutting unit 8 to be exposed to the outside.

Then, the present invention combines the technical constitution to prevent the transfer guiding holder 40 from being separated from the cutting unit housing 10 by the excessive rotation when the transfer guiding holder 40 is rotated and transferred downward.

For this technical constitution, a ring groove 43 is formed on the outer circumference of a lower part of the cutting unit housing 10. A snap ring 44 is fitted into the ring groove 43. The snap ring 44 is restrictively transferred by a stopper 45 formed to protrude on the inner circumference of the transfer guiding holder 40, thereby preventing the transfer guiding holder 40 from being separated.

In the bevel-extent controlling unit 60, the rotary spline 61 formed at the inner circumference of the bevel-extent controlling unit 60 is connected to the rotary spline 41 of the transfer guiding holder 40 and the fixed spline 12 of the cutting unit housing 10. When the bevel-extent controlling unit 60 is selectively transferred by upward or downward sliding, the rotary spline 61 maintains the rotation locking state resulting from the connection to the fixed spline 12, thereby consistently maintaining the preset extent of bevel.

Further, as illustrated in FIGS. 5 and 6, when the rotary spline 61 is separated from the fixed spline 12, the rotation locking state is temporarily released. Then, the bevel-extent controlling unit 60 is rotated and the transfer guiding holder 40 is simultaneously rotated and transfers up or down, so that the extent of exposure of a cutting tip 8a of the rotary cutting unit 8 being exposed to the outside is changed, to control the extent of bevel.

In the beveling machine according to the present invention, when the bevel-extent controlling unit 60 is transferred up or down, the elastic member 70 which maintains consistent elasticity and simultaneously maintains resilience to be returned to an original state is fitted between the bevel-extent controlling unit 60 and the supporting holder 50.

A spring cover 80 is insertedly positioned on the outside of the bevel-extent controlling unit 60 and the elastic member 70 and prevents the elastic member from being exposed to the outside, to be neater. The spring cover 80 includes an inwardly protruding part 81 formed at its lower end. A lower part of the elastic member 70 is elastically supported by the inwardly protruding part 81, thereby smoothly supplying the elasticity and the resilience to the bevel-extent controlling unit 60.

In the fixed spline 12 and the rotary splines 41 and 61 of the beveling machine according to the present invention, an irregular surface part is divided into equal parts (for example, thirty equal parts in the present invention) according to the extent of bevel to be minutely controlled. The ruler 30 with graduations includes beveling graduations 32 which are equally divided to be same as the irregular surface part being equally divided. Each beveling graduation 32 is divided into thirty equal parts by 0.1 mm. The range of controlling the extent of bevel may be set as 0 to 3 mm.

However, the splines and the beveling graduation 32 of the ruler with graduation are not limited to the embodiment of the present invention. The splines and the beveling graduations 32 may be divided into a number of equal parts. As the splines and the beveling graduations are divided into more equal parts, the extent of bevel can be controlled more minutely. The spline and the beveling graduations 32 should be divided into equal parts to be same as each other within the scope of the present invention.

In the beveling machine according to the present invention, reference setting graduation 63 is indicated on the outer circumference of the bevel-extent controlling unit 60. The reference setting graduation 63 enables an original reference point of the extent of bevel to be accurately reset.

This constitution is to easily reset the original reference point of the extent of bevel which is changed when reassembling the beveling machine according to the present invention to be the original state after it is dissembled to replace the cutting tip 8a of the rotary cutting unit 8. The reference setting graduation 63 is indicated vertically. Thus, as illustrated in FIG. 7, when the bevel-extent controlling unit 60 is rotated after the locking state thereof is released, the supporting holder 50 and the spring cover 80 are transferred up or down to be set to the reference setting graduation 63.

Accordingly, even though the reference point of the extent of bevel is changed after replacing the cutting tip 8a, the reference point of the extent of bevel is easily and accurately reset, thereby providing the convenience.

A process of controlling the extent of bevel according to the present invention will be described.

When the bevel-extent controlling unit 60 is transferred by downward sliding, as shown in FIG. 5, the rotary spline 61 of the bevel-extent controlling unit 60 is separated from the fixed spline 12 of the cutting unit housing 10, thereby temporarily releasing the locking state to allow the bevel-extent controlling unit 60 to rotate.

When the locking state is released and the bevel-extent controlling unit 60 is rotated, the transfer guiding holder 40 and the supporting holder 50 which are connected to the rotary splines 41 and 61 are simultaneously rotated to be transferred up or down, thereby changing the extent of exposure of the cutting tip 8a to control the extent of bevel.

In the process of controlling the extent of bevel, when the bevel-extent controlling unit 60 is rotated to be set to the beveling graduation 32 of the ruler 30 with graduations, the extent of bevel is accurately and minutely controlled. When the bevel-extent controlling unit 60 being held is unloosed after the extent of bevel is controlled, the bevel-extent controlling unit 60 is transferred by upward sliding by the elasticity of the elastic member 70, and the rotary spline 61 is connected to the fixed spline 12, to automatically maintain the locking state.

Since the fixed spline 12 has a lower end which is processed so as to be round-shaped (not shown), the rotary spline 61 is more easily connected to the fixed spline 12. When the connection of the fixed spline 12 and the rotary spline 61 is completed, the extent of bevel being preset is continuously and consistently maintained, thereby continuously securing the uniform extent of bevel and consequently improving the quality of work.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

The invention claimed is:

1. A beveling machine easily controlling the extent of bevel, comprising:
    a cutting unit housing (10) inside which a rotary cutting unit (8) is rotatively positioned and which includes a fixed spline (12) formed on an outer surface of an upper part thereof;
    an adapter (20 or 20a) which is connected to the upper part of the cutting unit housing (10) by a screw and which is selectively connected to a tool for supplying a rotation force to the rotary cutting unit (8);
    a ruler (30) with graduations which is fitted between an outward flange (26) formed on an outside of the adapter (20 or 20a) and the cutting unit housing (10);
    a transfer guiding holder (40) which is connected to an outside of the cutting unit housing (10) by a screw, so as to be up or down transferred, and which includes a rotary spline (41) formed on an outer surface thereof;
    a supporting holder (50) which is connected to a lower part of the transfer guiding holder (40) by a screw and which includes a guide plate (51) positioned under the supporting holder (50);
    a bevel-extent controlling unit (60) which includes a rotary spline (61) formed on an inner surface thereof and which controls and maintains the extent of bevel while being selectively transferred by upward or downward sliding, wherein the rotary spline (61) of the bevel-extent controlling unit is connected to the rotary spline (41) of the transfer guiding holder (40) and the fixed spline (12) of the cutting device housing (10); and
    an elastic member (70) which is fitted between the bevel-extent controlling unit (60) and the supporting holder (50), and supplies elasticity to the bevel-extent controlling unit (60).

2. The beveling machine of claim 1, wherein the adapter (20) is installed so that a power shaft (23) with a spiral bevel gear (22) is positioned to be rotated in the middle of the adapter, the power shaft (23) is connected to a rotation shaft (24) by a screw, the rotation shaft (24) is connected to the rotary cutting unit (8), and a mounting plate (25) positioned in the adapter (20) is connected to a direction changing unit (2) of a beveling body (1) so that the rotation force of the beveling body (1) is transferred to the spiral bevel gear (22).

3. The beveling machine of claim 1, wherein the adapter (20a) is connected to an air tool (9) by a screw so that a power shaft (23) penetrates the upper part of the adapter (20a), the power shaft (23) is connected to a rotation shaft (24) by a screw, the rotation shaft (24) is connected to the rotary cutting unit (8), and the rotation force of the air tool (9) is transferred.

4. The beveling machine of claim 1, further comprising:
    a spring cover (80) which is insertedly positioned on the outside of the bevel-extent controlling unit (60) and the elastic member (70), wherein a lower part of the elastic member (70) is elastically supported by an inwardly protruding part (81) formed on a lower end of the spring cover (80).

5. The beveling machine of claim 1, wherein a ring groove (43) is formed on an outer circumference of a lower part of the cutting device housing (10), a snap ring (44) is positioned in the ring groove (43) and prevents the transfer guiding holder (40) from being separated from the cutting unit housing (10) when the transfer guiding holder (40) is excessively rotated, and a stopper (45) is formed in the transfer guiding holder (40) and limits the transfer of the snap ring (44).

6. The beveling machine of claim 1, wherein a reference setting graduation (63) is indicated on an outer circumference of the bevel-extent controlling device (60) and accurately resets an original reference point of the extent of bevel when reassembling the beveling machine which is dissembled to replace a cutting tip (8a) of the rotary cutting unit (8).

7. The beveling machine of claim 1, wherein a beveling graduation (32) is indicated in the ruler (30) with graduations, and the beveling graduation (32) is divided into equal parts.

* * * * *